United States Patent
Najumudeen et al.

(10) Patent No.: US 11,070,454 B1
(45) Date of Patent: Jul. 20, 2021

(54) SYSTEM FOR ROUTING FUNCTIONALITY PACKETS BASED ON MONITORING REAL-TIME INDICATORS

(71) Applicant: BANK OF AMERICA CORPORATION, Charlotte, NC (US)

(72) Inventors: Syed Najumudeen, Telangana (IN); Rajesh Agarwal, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/907,454

(22) Filed: Jun. 22, 2020

(51) Int. Cl.
*G06F 15/173* (2006.01)
*H04L 12/26* (2006.01)
*H04L 29/06* (2006.01)

(52) U.S. Cl.
CPC .......... *H04L 43/0817* (2013.01); *H04L 43/04* (2013.01); *H04L 43/16* (2013.01); *H04L 63/1425* (2013.01)

(58) Field of Classification Search
CPC ..... H04L 43/0817; H04L 43/04; H04L 43/16; H04L 63/1425
USPC ................................................. 709/203, 224
See application file for complete search history.

(56) References Cited

U.S. PATENT DOCUMENTS

| | | |
|---|---|---|
| 5,304,112 A | 4/1994 | Mrklas et al. |
| 5,343,869 A | 9/1994 | Pross et al. |
| 5,410,471 A | 4/1995 | Alyfuku et al. |
| 5,435,315 A | 7/1995 | McPhee et al. |
| 5,441,047 A | 8/1995 | David et al. |
| 5,570,301 A | 10/1996 | Barrus |
| 5,813,993 A | 9/1998 | Kaplan et al. |
| 5,937,387 A | 8/1999 | Summerell et al. |
| 6,104,296 A | 8/2000 | Yasushi et al. |
| 8,096,946 B2 | 1/2012 | Burton |
| 9,526,455 B2 | 12/2016 | Horseman |
| 9,842,313 B2 | 12/2017 | BFar et al. |
| 2003/0163351 A1 | 8/2003 | Brown et al. |
| 2003/0226695 A1 | 12/2003 | Mault |
| 2004/0167381 A1 | 8/2004 | Lichter et al. |
| 2007/0060824 A1 | 3/2007 | Lam et al. |
| 2007/0244724 A1 | 10/2007 | Pendergast et al. |
| 2007/0299325 A1 | 12/2007 | Farrell et al. |
| 2008/0177158 A1 | 7/2008 | Teller et al. |
| 2008/0177614 A1 | 7/2008 | An et al. |
| 2008/0177836 A1 | 7/2008 | Bennett |
| 2008/0188777 A1 | 8/2008 | Bedziouk et al. |

(Continued)

FOREIGN PATENT DOCUMENTS

JP 2004113581 A 4/2004

*Primary Examiner* — Duyen M Doan
(74) *Attorney, Agent, or Firm* — Michael A. Springs; Moore & Van Allen PLLC; Nicholas C. Russell

(57) ABSTRACT

Embodiments of the present invention provide a system for routing functionality packets based on monitoring real-time indicators. The system is configured for continuously gathering real-time input data from one or more monitoring devices, wherein the real-time input data is associated with at least one user, extracting computed data from a data repository, aggregating and processing the real-time input data and the computed data, and in response to aggregating and processing the real-time input data and the computed data, dynamically identifying a real-time anomaly associated with the at least one user.

18 Claims, 6 Drawing Sheets

(56) References Cited

U.S. PATENT DOCUMENTS

| | | | |
|---|---|---|---|
| 2014/0107932 A1* | 4/2014 | Luna | G01D 21/00 |
| | | | 702/19 |
| 2017/0178052 A1* | 6/2017 | Durham | G06Q 10/06311 |
| 2018/0032944 A1* | 2/2018 | Sarvana | G06Q 10/063114 |

* cited by examiner

SYSTEM FOR ROUTING FUNCTIONALITY PACKETS BASED ON MONITORING REAL-TIME INDICATORS

BACKGROUND

Conventional systems do not have the capability to route functionality packets based on monitoring real-time indicators. As such, there exists a need for a system that routes functionality packets based on monitoring real-time indicators to improve the efficiency of creating and deploying functionality packets.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for routing functionality packets based on monitoring real-time indicators. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention continuously gathers real-time input data from one or more monitoring devices, wherein the real-time input data is associated with at least one user, extracts computed data from a data repository, aggregates and processes the real-time input data and the computed data, and in response to aggregating and processing the real-time input data and the computed data, dynamically identifies a real-time anomaly associated with the at least one user.

In some embodiments, the present invention in response to dynamically identifying a real-time anomaly, automatically performs one or more actions.

In some embodiments, the one or more actions comprises automatically routing incoming functionality packets, wherein the functionality packets are associated with at least one operation of an entity, wherein each of the functionality packets comprises one or more assignments.

In some embodiments, the one or more actions comprise identifying at least one other user that is capable of completing one or more assignments in at least one functionality packet allocated to the at least one user; and rerouting the at least one functionality to the at least one other user.

In some embodiments, the one or more actions comprise automatically generating one or more notifications associated with the at least one anomaly and transmitting the one or more notifications to at least one other user, wherein the at least one other user is associated with the at least one user.

In some embodiments, the present invention collects activity data from the one or more monitoring devices over a period of time, wherein the input data is associated with one or more users comprising the at least one user, collects failure data associated with one or more operations of an entity, extracts operation data associated with the one or more operations of the entity, stores the input data and the failure data in a data repository, and processes the input data, the operation data, and the failure data to generate the computed data.

In some embodiments, processing the input data, the operation data, and the failure data comprises: identifying one or more failures based on the failure data, correlating the one or more failures with the activity data to determine one or more patterns associated with the one or more users, wherein at least a part of the one or more users are associated with the one or more failures, and determining threshold limits associated with the one or more users based on the one or more patterns and the operation data, wherein the threshold limits and the one or more patterns in combination forms the computed data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
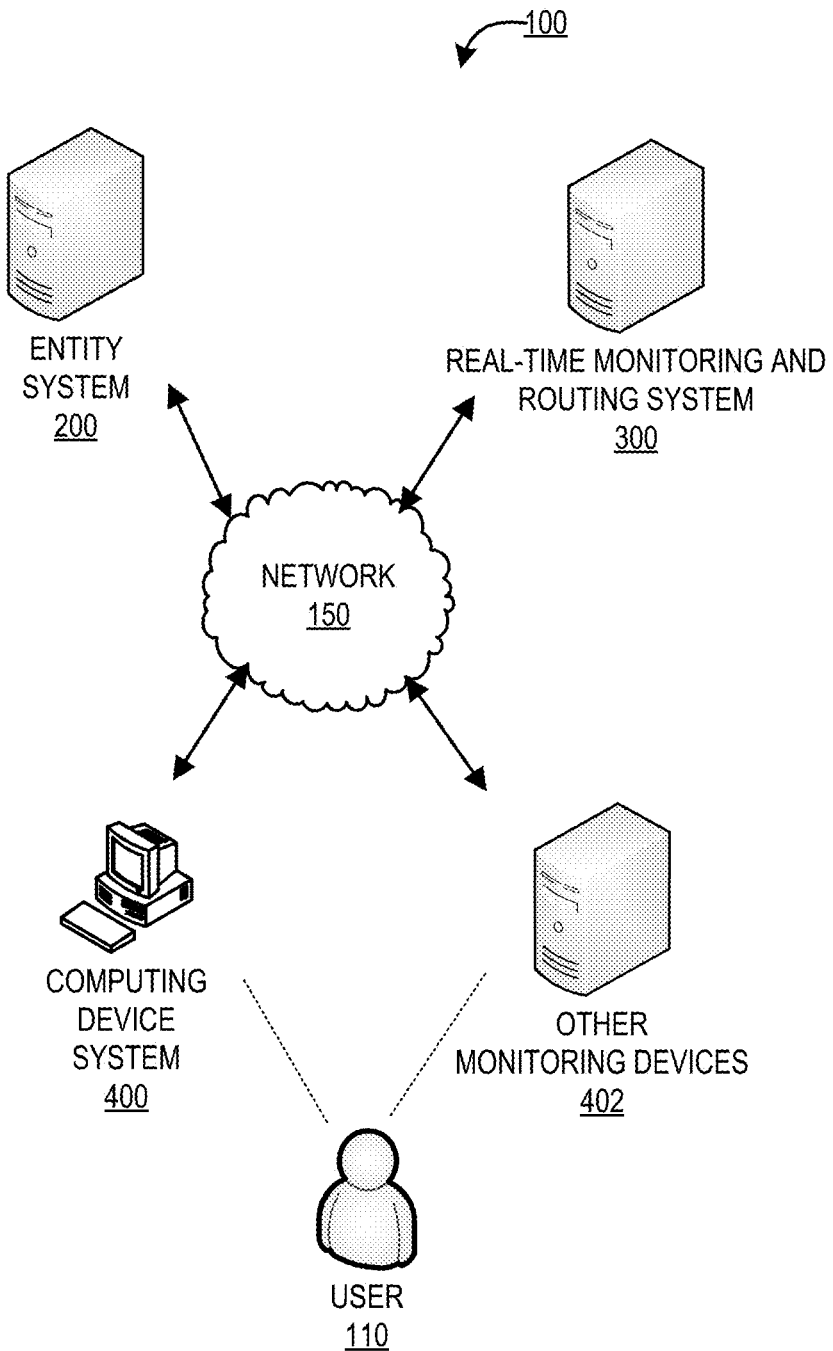
Figure 2:
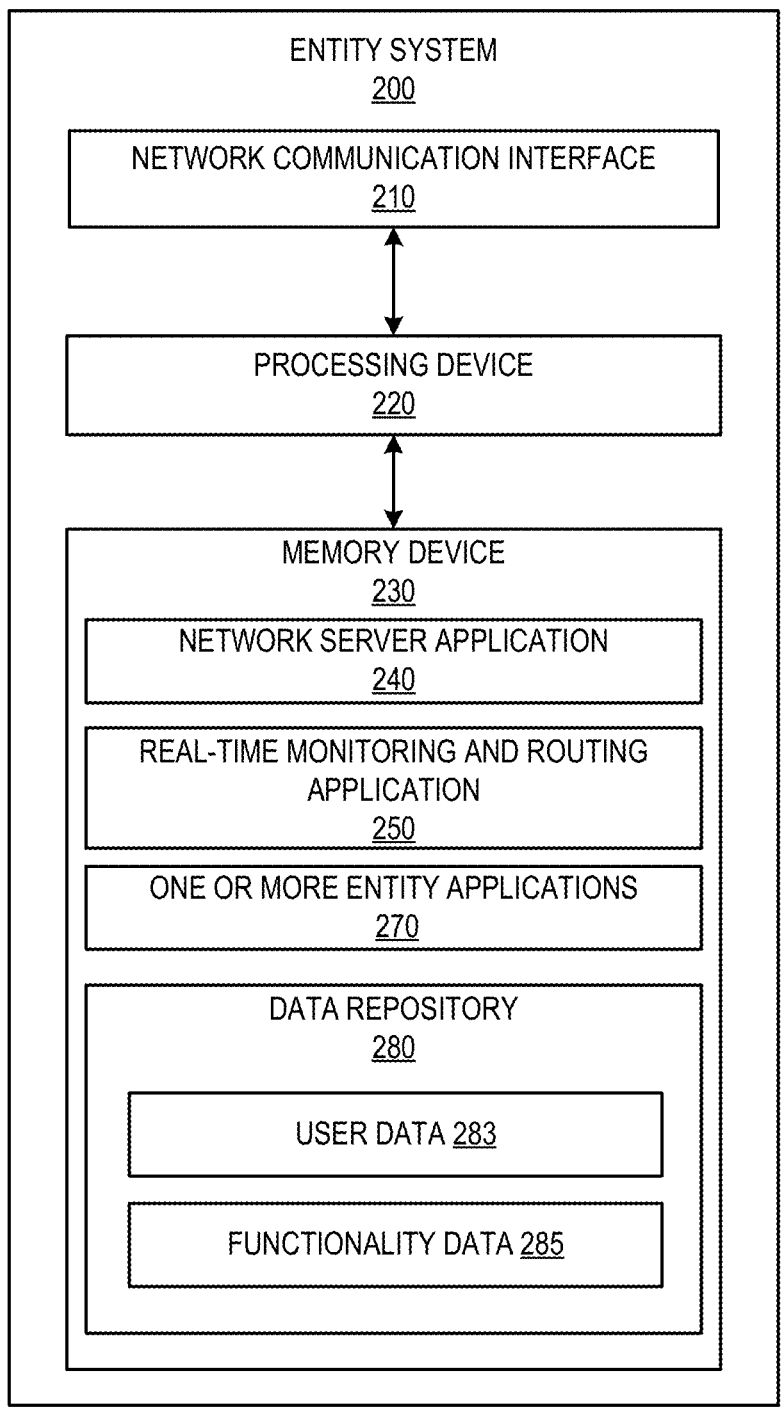
Figure 3:
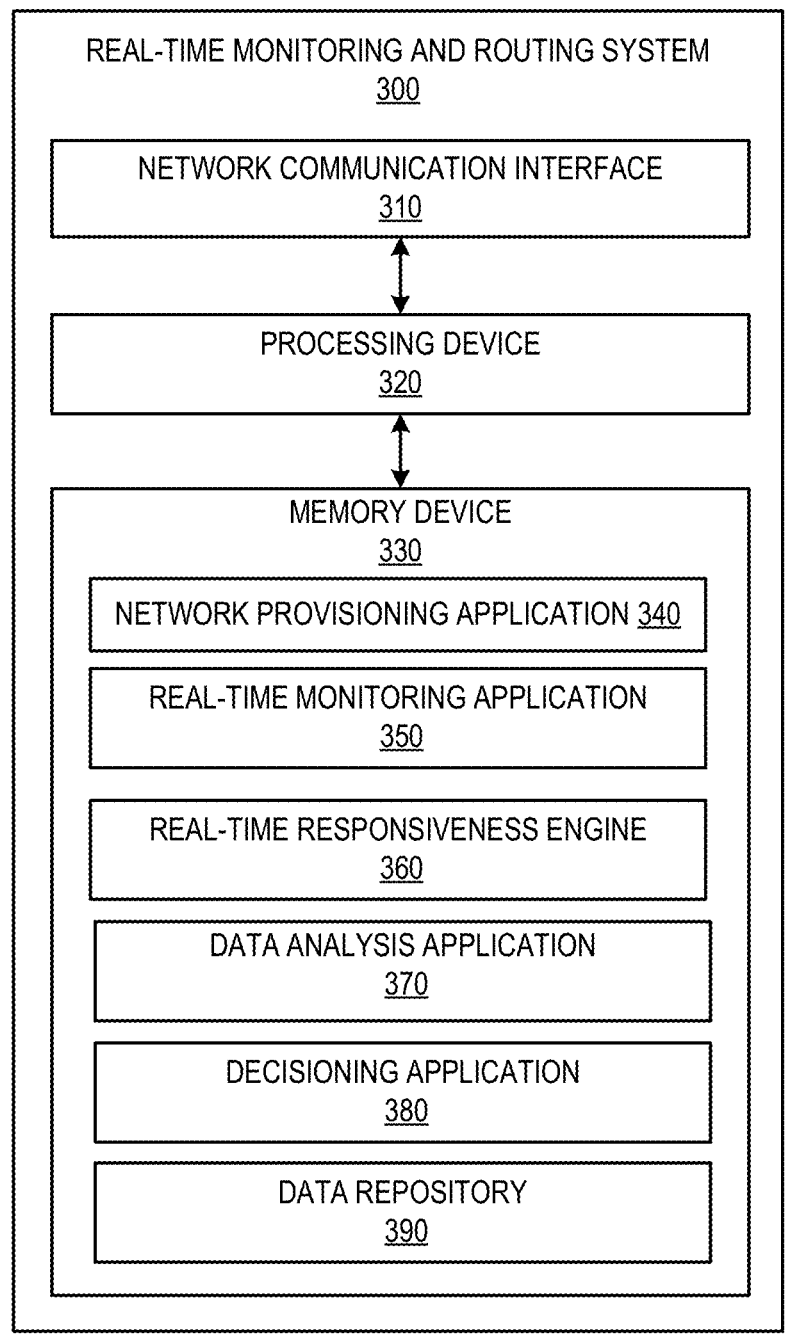
Figure 4:
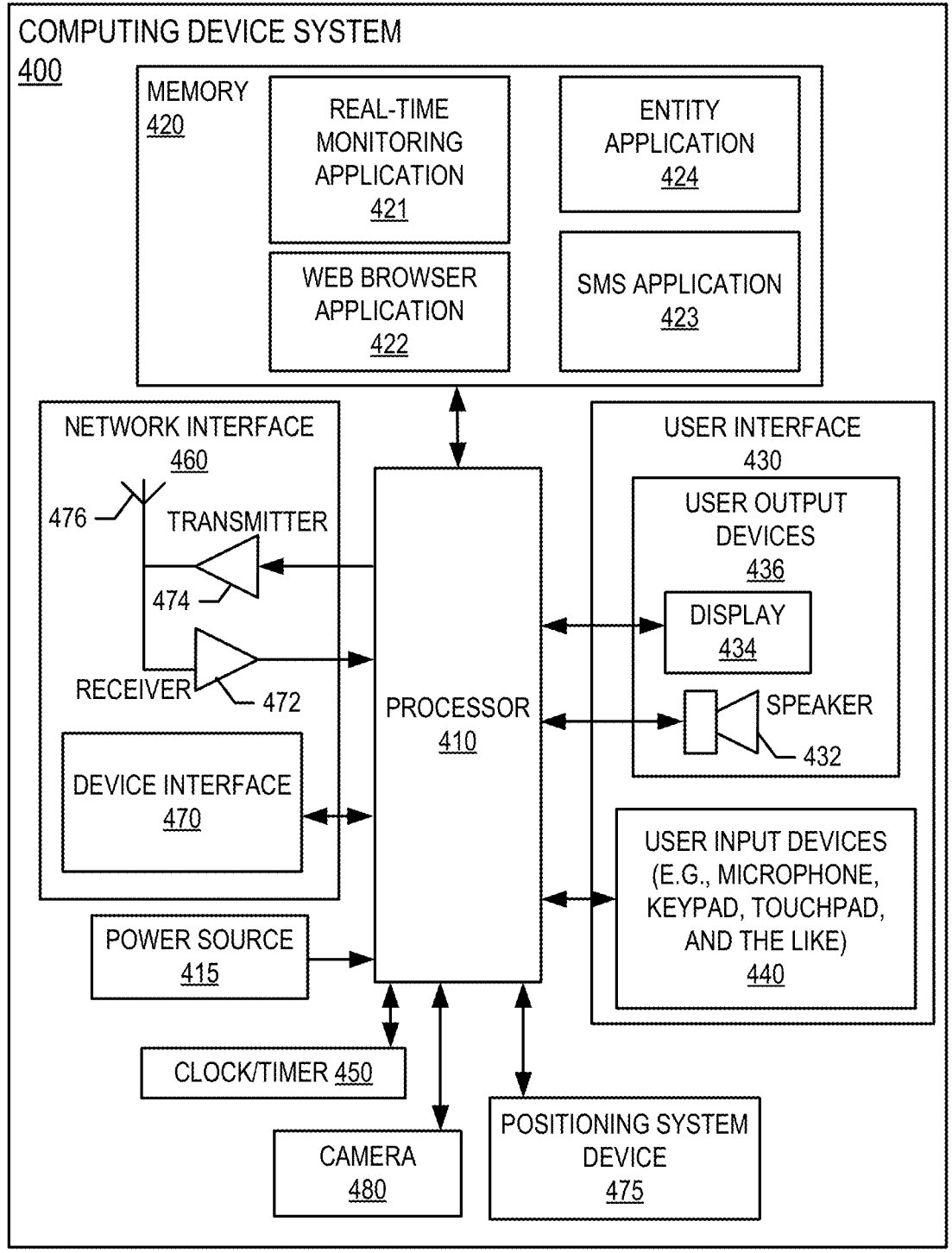
Figure 5:
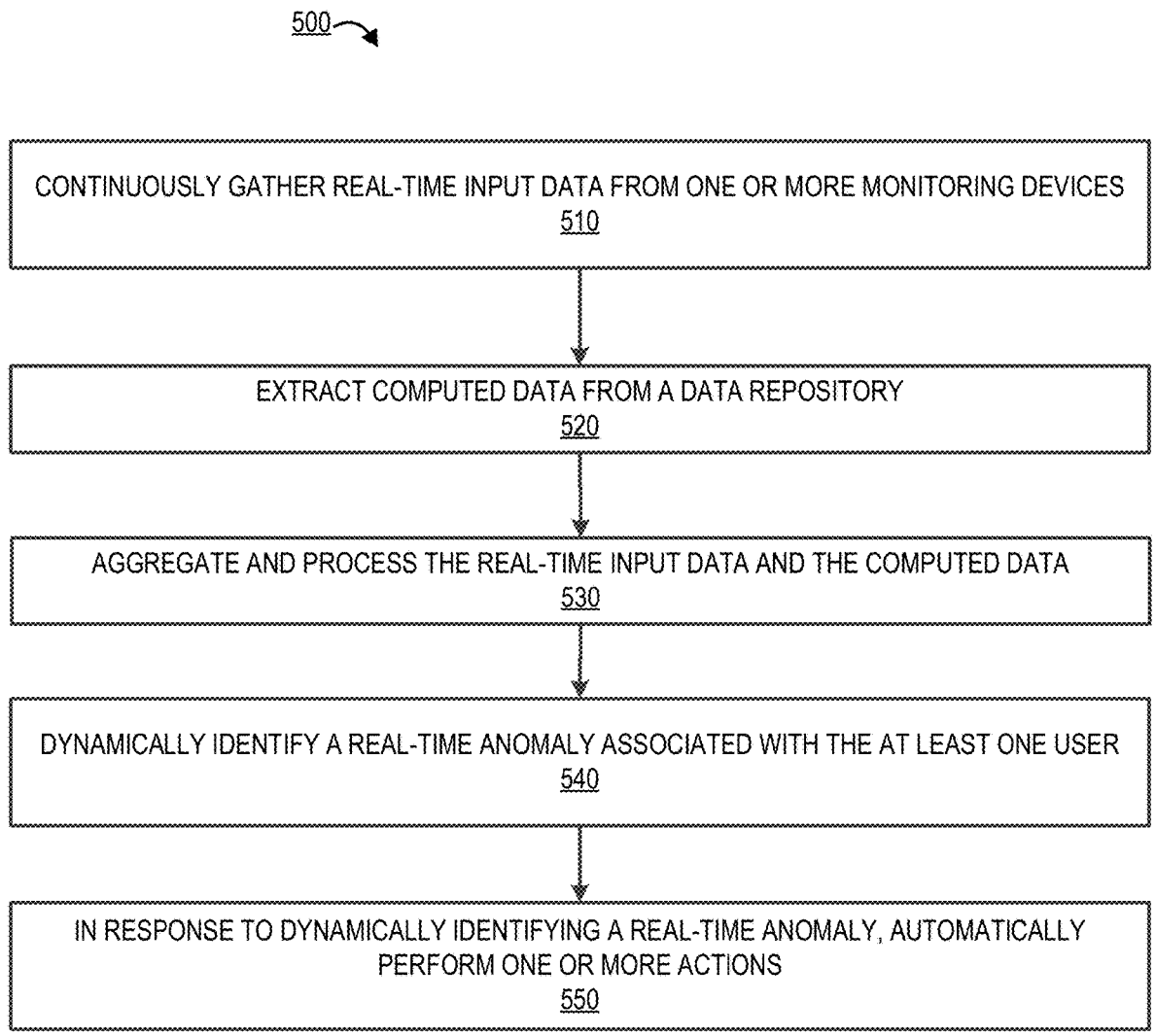
Figure 6:
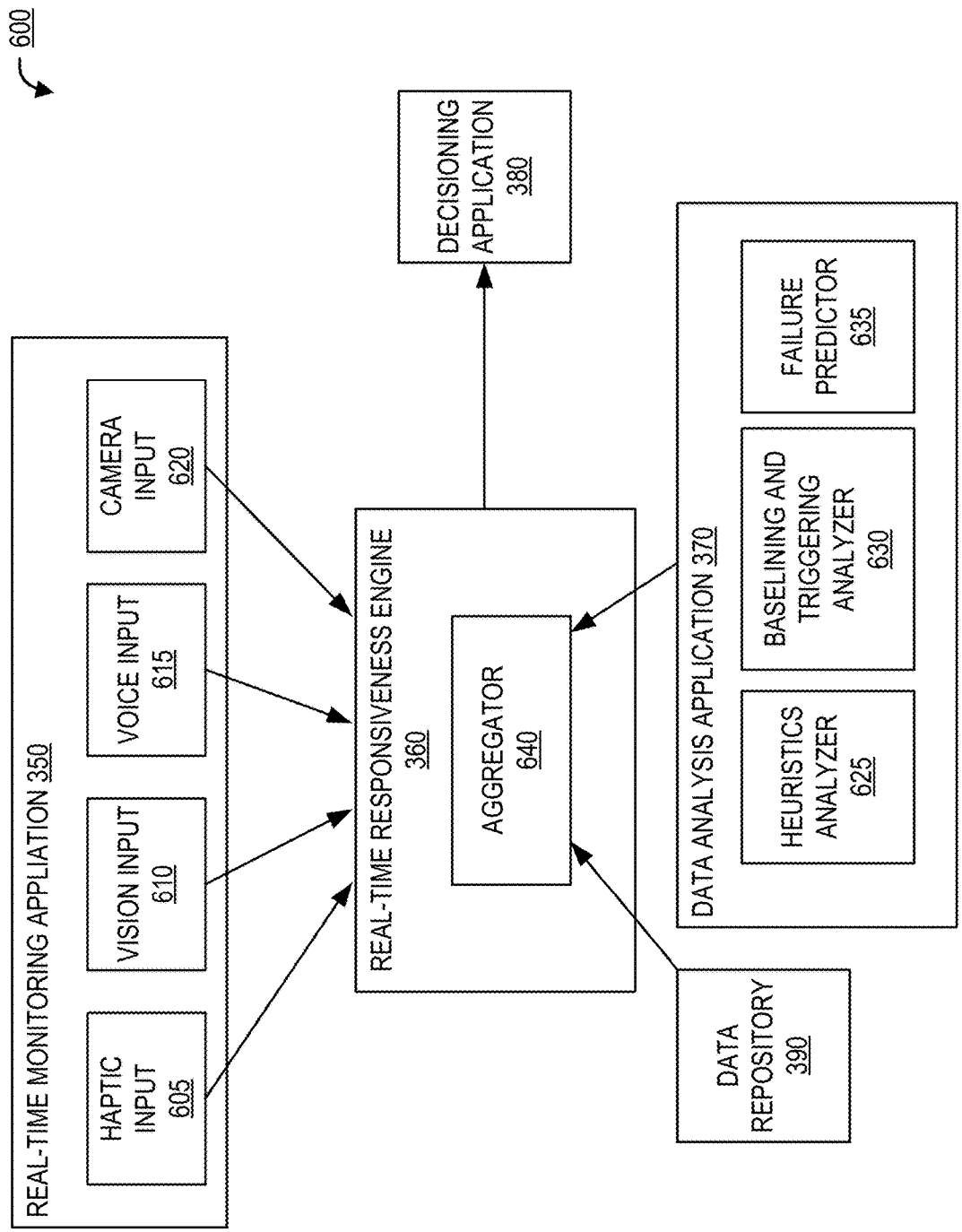

Having thus described embodiments of the invention in general terms, reference will now be made the accompanying drawings, wherein:

FIG. 1 provides a block diagram illustrating a system environment for routing functionality packets based on monitoring real-time indicators, in accordance with an embodiment of the invention;

FIG. 2 provides a block diagram illustrating the entity system 200 of FIG. 1, in accordance with an embodiment of the invention;

FIG. 3 provides a block diagram illustrating a real-time monitoring and routing system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for routing functionality packets based on monitoring real-time indicators, in accordance with an embodiment of the invention; and FIG. 6 provides a block diagram illustrating the process flow for routing functionality packets based on monitoring real-time indicators, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" may be any organization that performs one or more operations, where the one or more operations may be associated with business management, technology, marketing, medicine, education, or the like. In some embodiments, an "entity" as used herein may be an organization that develops, manages, and/or maintains one or more applications, databases, servers, or the like. In some specific embodiments, an "entity" as used herein may include any financial institutions such as commercial banks, thrifts, federal and state savings banks, savings and loan associations, credit unions, investment companies, insurance companies and the like.

As described herein, a "functionality packet" may be a set of requirements that are associated with fulfilling the one or more operations of an entity. In an exemplary embodiment, where the entity is an organization that develops applications, the functionality packet may comprise requirements associated with one or more functionalities of at least one application that need to be implemented to manage, or improve, add new features to the at least one application. Typically, the one or more functionalities are developed and deployed into real-time environment.

As described herein, a "user" may be an employee of the entity, where the employee may be a full-time employee, contractor, sub-contractor, or the like. Continuing with the previous example, where the entity is an organization that develops applications, the user may be an application developer, application tester, or the like. In some embodiments, of the invention, the functionality packets are assigned to one or more users with an entity, where the one or more users develop functionalities that are associated with the requirements in the functionality packets.

Many of the example embodiments and implementations described herein contemplate interactions engaged in by the user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically employees within an entity may be stressed as a result of work environment and/or personal environment. Currently, no systems exist that can capture real-time data associated with the employees and automatically determine whether the employees are stressed or not. Therefore, conventional systems do not have the capability to identify whether operations associated with the entity will be hindered due to the lack of detection of stress levels of the employees. As such, there exists a need for a system to capture real-time data associated with the employees, determine whether the employees are stressed, and also determine whether operations of the entity will be completed in a timely manner. The system of the present invention solves the aforementioned problems as discussed in detail below.

FIG. 1 provides a block diagram illustrating a system environment 100 for routing functionality packets based on monitoring real-time indicators, in accordance with an embodiment of the invention. As illustrated in FIG. 1, the environment 100 includes a real-time monitoring and routing system 300, an entity system 200, a computing device system 400, and other monitoring devices 402. One or more users 110 may be included in the system environment 100, where the users 110 interact with the other entities of the system environment 100 via a user interface of the computing device system 400. In some embodiments, the one or more user(s) 110 of the system environment 100 may be employees of the entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution. In some embodiments, the entity is any organization that develops, manages, and maintains applications, databases, servers, or the like. In some such embodiments, functionality packets as described herein are generated and assigned to the one or more users 110 by the entity system 200.

The real-time monitoring and routing system 300 is a system of the present invention for performing one or more process steps described herein. In some embodiments, the real-time monitoring and routing system 300 may be an independent system. In some embodiments, the real-time monitoring and routing system 300 may be a part of the entity system 200. In some embodiments, where the functionality packets are generated and assigned by the entity system 200, the real-time monitoring and routing system 300 assists the entity system 200 in assigning the functionality packets to the one or more users 110. In some embodiments, the real-time monitoring and routing system 300 may automatically interrupts and takes over the process of assigning the functionality packets to the one or more users 110.

The real-time monitoring and routing system 300, the entity system 200, the computing device system 400, and the other monitoring devices 402 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the real-time monitoring and routing system 300 is configured to communicate information or instructions with the entity system 200, and/or the computing device system 400 across the network 150.

The computing device system 400 may be a system owned or controlled by the entity of the entity system 200 and/or the one or more users 110. As such, the computing device system 400 may be a computing device of the user 110. In general, the computing device system 400 communicates with the user 110 via a user interface of the computing device system 400, and in turn is configured to communicate information or instructions with the real-time monitoring and routing system 300, and/or entity system 200 across the network 150. In some embodiments, the computing device system may comprise components such as mouse, keyboard, touch screen, camera, microphone, or the like to capture information (e.g., behavioral parameters) associated with the one or more users 110.

In some embodiments, the other monitoring devices 402 may include, but are not limited to visual devices (e.g., camera), IoT trackers, auditory devices (e.g., telephone), or any other devices that are capable to capturing information (e.g., behavioral parameters) associated with the one or more users 110 in an non-intrusive manner. The other monitoring devices may be owned and/or controlled by the entity of the entity system 200 and/or the one or more users 110. In some embodiments, each of the other monitoring devices 402 may include a real-time monitoring application provided by the real-time monitoring and routing system 300 to facilitate the capture of information associated with the one or more users 110. In some embodiments, the other monitoring devices may also include any wearable devices such as a smart watch, activity tracker, or the like.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a real-time monitoring and routing application 250, one or more entity applications 270, and a data repository 280 comprising information associated with user data 283 and functionality data 285. User data 283 may comprise operation related information (e.g., applications that the users are working on), usage data (e.g., applications used by the user), personal information (e.g., location, date of birth, job description, etc.) or the like. Functionality data 285 may comprise functionalities associated with one or more operations of the entity. In some specific embodiments, the functionality data 285 may comprise information associated with the one or more entity applications 270 that are managed, developed, controlled, or utilized by the entity and the one or more users 110 of the entity. In some embodiments, the data repository 280 may further comprise failure data, where the failure data is associated with one or more failures of one or more operations of an entity. For example the data repository may comprise information associated with the failure of fulfillment of one or more requirements within a defined time limit. The computer-executable program code of the network server application 240, the real-time monitoring and routing application 250, the one or more entity applications 270 to perform certain logic, data-extraction, and data-storing functions of the entity system 200 described herein, as well as communication functions of the entity system 200.

The network server application 240, the real-time monitoring and routing application 250, and the one or more entity applications 270 are configured to store data in the data repository 280 or to use the data stored in the data repository 280 when communicating through the network communication interface 210 with the real-time monitoring and routing system 300, the computing device system 400, and/or other monitoring devices 402 to perform one or more process steps described herein. In some embodiments, the entity system 200 may receive instructions from the real-time monitoring and routing system 300 via the real-time monitoring and routing application 250 to perform certain operations. The real-time monitoring and routing application 250 may be provided by the real-time monitoring and routing system 300. The one or more entity applications 270 may be any of the applications used, created, modified, facilitated, and/or managed by the entity system 200.

FIG. 3 provides a block diagram illustrating the real-time monitoring and routing system 300 in greater detail, in accordance with embodiments of the invention. As illustrated in FIG. 3, in one embodiment of the invention, the real-time monitoring and routing system 300 includes one or more processing devices 320 operatively coupled to a network communication interface 310 and a memory device 330. In certain embodiments, the real-time monitoring and routing system 300 is operated by an entity, such as a financial institution. In some embodiments, the real-time monitoring and routing system 300 may be an independent system. In alternate embodiments, the real-time monitoring and routing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the real-time monitoring and routing system 300 described herein. For example, in one embodiment of the real-time monitoring and routing system 300, the memory device 330 includes, but is not limited to, a network provisioning application 340, a real-time monitoring application 350, a real-time responsiveness engine 360, a data analysis application 370, a decisioning application 380, and a data repository 390 comprising data processed or accessed by one or more applications in the memory device 330. The computer-executable program code of the network provisioning application 340, the real-time monitoring application 350, the real-time responsiveness engine 360, the data analysis application 370, and the decisioning application 380 may instruct the processing device 320 to perform certain logic, data-processing, and data-storing functions of the real-time monitoring and routing system 300 described herein, as well as communication functions of the real-time monitoring and routing system 300.

The network provisioning application 340, the real-time monitoring application 350, the real-time responsiveness engine 360, the data analysis application 370, and the decisioning application 380 are configured to invoke or use the data in the data repository 390 when communicating through the network communication interface 310 with the entity system 200, and/or the computing device system 400. In some embodiments, the network provisioning application 340, the real-time monitoring application 350, the real-time responsiveness engine 360, the data analysis application 370, and the decisioning application 380 may store the data extracted or received from the entity system 200, and the computing device system 400 in the data repository 390. In some embodiments, the network provisioning application 340, the real-time monitoring application 350, the real-time responsiveness engine 360, the data analysis application 370, and the decisioning application 380 385 may be a part of a single application stored in the memory device 330. The functions of the real-time monitoring application 350, the real-time responsiveness engine 360, the data analysis application 370, and the decisioning application 380 are described in more detail in FIG. 6.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. In some embodiments, the display 430 may a touch-screen display, where the user is capable of acting as an input device to the computing device system 400.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera. In some embodiments, the computing device system 400 may comprise haptic sensors, touch sensors or the like to capture the activity and/or behavioral parameters of the one or more users 110 using the computing device system 400.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time monitoring application 421, an SMS application 423, and an entity application 424. These applications also typically instructions to a graphical user interface (GUI) on the display 430 that allows the user 110 to interact with the entity system 200, the real-time monitoring and routing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time monitoring application 421 provided by the real-time monitoring and routing system 300 allows the real-time monitoring and routing system 300 to capture activity and behavioral parameters of the user.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for routing functionality packets based on monitoring real-time indicators, in accordance with an embodiment of the invention.

As shown in block 510, the system continuously gathers real-time input data from one or more monitoring devices. Real-time input data may comprise real-time activity of the user. One or more monitoring devices may include, but are not limited to, mouse, keyboard, camera, microphone, haptic sensor, touch sensor, or the like in the computing device of the users, external cameras, motion sensors, telephone, other auditory devices, wearable devices, or the like. The system gathers real-time input data that captures the behavior and activity of at least one user in real-time using the aforementioned one or more monitoring devices.

As shown in block 520, the system extracts computed data from a data repository. The computed data may comprise historical activity data associated with the at least one user that has been transformed or processed by the system before the initiation of the process flow 500. The historical activity data of at least one user is captured and saved by the system over a period of time. The system also extracts failure data from the entity system and identifies one or more failures from the failure data that occurred during the period of time. The system then correlates the failure data and the activity data to determine one or more patterns. The one or more patterns may be behavioral patterns associated with the at least one user involved in one or more operations that are associated with the one or more failures. For example, the system may determine that a requirement deadline was not met based on the failure data and may correlate this failure with the activity data of one or more users, where the activity data is the data that was collected during the time period the one or more users were working on the requirement deadline. The system identifies one or more patterns associated with the behavior of the one or more users that contributed to the failure. The one or more patterns may be associated with typing mistakes of the user, language used by the user in emails, text messages, or the like, mouse click speed, mouse scroll speed, vision movements, language used by the user during a phone call, or the like. The one or more patterns may be associated with behavioral anomalies associated with the one or more users that may have contributed to the one or more failures. In some embodiments, the system based on the one or more patterns and operation related data (e.g., number of functionality packets assigned to a user, time frame associated with fulfilling the requirements in the functionality packets, or the like) may determine threshold limits of the one or more users. Threshold limit may be defined as the capability of a user to complete at least a part of an operation (e.g., requirements in a functionality packet) without causing any behavioral anomalies (e.g., getting stressed). For example, the system may identify that a user is working on ten functionality packets and based on the behavior patterns exhibited by the user while working on the functionality packets, the system may identify threshold limits of the user. The system re-calculates and regularly updates the threshold limits based on the activity data collected by the system continuously. The threshold limits and the one or more patterns in combination forms the computed data.

As shown in block 530, the system aggregates and processes the real-time input data and the computed data. The system continuously aggregates the real-time input data and the computed data analyzes the real-time time input data continuously. The real-time input data provides behavioral indicators that allows the system to identify whether a user is stressed or not.

As shown in block 540, the system dynamically identifies a real-time anomaly associated with the at least one user. Based on the analysis of the real-time input data, the system determines a real-time anomaly. The system may identify that real-time behavior of the at least one user matches the one or more patterns in the computed data and determines the real-time anomaly associated with the behavior of the at least one user. The system based on identifying the real-time anomaly, predicts occurrence of a failure in the future, where the failure is associated with current work (e.g., requirements in at least one functionality package) of the at least one user.

As shown in block 550, the system in response to dynamically identifying a real-time anomaly, automatically performs one or more actions. The one or more actions may comprise routing of incoming functionality packets to at least one other user. For example, the system may identify that the user is already stressed based on the identification of a similarity in the one or more patterns and the real-time behavior of the user and may assign additional requirements to other users who are not stressed. The routing of incoming functionality packets may also be based on threshold limits of the one or more users and the current operation data. For example, the system may identify that the threshold limit of a user is working on four functionality packets and the system may further identify that the user is already working on four functionality packets and may route the incoming functionality packets to another user whose threshold limit has not been reached. In some embodiments, the one or more actions may comprise reallocating the functionality packets associated with the user to another user.

The one or more actions may comprise generating and transmitting notifications associated with the real-time anomaly. For example, the system may identify that a first user is stressed and may generate a notification and may transfer it to a manager of the first user. In other embodiments, the one or more actions may comprise automatically assigning vacation time to the user associated with the real-time anomaly. In some embodiments, the system may assign the vacation time only after receiving an approval from manager of the user associated with the real-time anomaly. In some embodiments, the one or more actions may comprise providing work related training to the user.

FIG. 6 provides a block diagram 600 illustrating the process flow for routing functionality packets based on monitoring real-time indicators, in accordance with an embodiment of the invention. As shown, the real-time monitoring application 350 of the real-time monitoring and routing system 300 gathers real-time input data from one or more monitoring devices, where the real-time input data comprises at least haptic input 605, vision input 610, voice input 615, and camera input 620. In some embodiments, the haptic input 605 is gathered from the haptic sensors present in the computing device system 400. In some embodiments, the vision input 610 is gathered from the camera present in the computing device system 400, camera present in a personal device of the user, or the like. In some embodiments, the voice input 615 is gathered from a telephone, a microphone present in the computing device system 400, or the like. The real-time monitoring and routing system 300 may gather the voice input 615 and may utilize voice/speech recognition software to identify the data from the voice input 615. In some embodiments, the system gathers the camera input 620 from cameras and/or sensors present in the work environment. In some embodiments, the real-time monitoring application 350 may also gather data from a wearable device of the user.

The real-time monitoring application 350 passes the real-time input data to the real-time responsiveness engine 350 comprising an aggregator 640. The aggregator 640 also extracts data from the data repository 390 and the data analysis engine 370, where the data analysis engine 370 comprises a heuristics analyzer 625, a baselining and triggering analyzer 630, and a failure predictor 635. In some embodiments, the aggregator may store the real-time input data gathered by the real-time monitoring application 350 in the data repository 390 which is accessible by the data analysis engine 370. The heuristics analyzer 625 identifies one or more patterns. The baselining and triggering analyzer 630 identifies one or more threshold limits and triggers associated with the one or more users as explained in detail in FIG. 5. The failure predictor 635 determines occurrence of future failures based on the data provided by the aggregator. The data analysis engine 370 supplies the aggregator 640 with computed data, where the real-time responsiveness engine 360 provides an output to the decisioning application 380 based on the computed data and the real-time input data, where the output may be a real-time anomaly identified by the real-time responsiveness engine 360. The decisioning application 380 based on the output recommends one or more actions. In some embodiments, the decisioning application 380 may automatically implement the one or more actions. Examples of the one or more actions are described in detail in FIG. 5.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for routing functionality packets based on monitoring real-time indicators, the system comprising:
    at least one network communication interface;
    at least one non-transitory storage device; and
    at least one processing device coupled to the at least one non-transitory storage device and the at least one network communication interface, wherein the at least one processing device is configured to:
        collect activity data from one or more monitoring devices over a period of time, wherein the activity data is associated with one or more users comprising at least one user;
        collect failure data associated with one or more operations of an entity;
        extract operation data associated with the one or more operations of the entity;
        process the activity data, the operation data, and the failure data to generate computed data;
        continuously gather real-time input data from the one or more monitoring devices, wherein the real-time input data is associated with the at least one user;
        aggregate and process the real-time input data and the computed data, wherein processing comprises comparing the real-time input data and the computed data; and
        in response to aggregating and processing the real-time input data and the computed data, dynamically identify a real-time anomaly associated with the at least one user.

2. The system of claim 1, wherein the at least one processing device is configured to:
    in response to dynamically identifying the real-time anomaly, automatically perform one or more actions.

3. The system of claim 2, wherein the one or more actions comprises automatically routing incoming functionality packets, wherein the functionality packets are associated with at least one operation of the entity, wherein each of the functionality packets comprises one or more assignments.

4. The system of claim 2, wherein the one or more actions comprise:
    identifying at least one other user that is capable of completing one or more assignments in at least one functionality packet allocated to the at least one user; and
    rerouting the at least one functionality packet to the at least one other user.

5. The system of claim 2, wherein the one or more actions comprise:
    automatically generating one or more notifications associated with the real-time anomaly; and
    transmitting the one or more notifications to at least one other user, wherein the at least one other user is associated with the at least one user.

6. The system of claim 1, wherein processing the activity data, the operation data, and the failure data comprises:
    identifying one or more failures based on the failure data;
    correlating the one or more failures with the activity data to determine one or more patterns associated with the one or more users, wherein at least a part of the one or more users are associated with the one or more failures; and
    determining threshold limits associated with the one or more users based on the one or more patterns and the operation data, wherein the threshold limits and the one or more patterns in combination forms the computed data.

7. A computer program product for routing functionality packets based on monitoring real-time indicators, the computer program product comprising a non-transitory computer-readable storage medium having computer executable instructions for causing a computer processor to perform the steps of:

collecting activity data from one or more monitoring devices over a period of time, wherein the activity data is associated with one or more users comprising at least one user;

collecting failure data associated with one or more operations of an entity;

extracting operation data associated with the one or more operations of the entity;

processing the activity data, the operation data, and the failure data to generate computed data;

continuously gathering real-time input data from the one or more monitoring devices, wherein the real-time input data is associated with the at least one user;

aggregating and processing the real-time input data and the computed data, wherein processing comprises comparing the real-time input data and the computed data; and in response to aggregating and processing the real-time input data and the computed data, dynamically identifying a real-time anomaly associated with the at least one user.

8. The computer program product of claim 7, wherein the computer executable instructions cause the computer processor to:

in response to dynamically identifying the real-time anomaly, automatically perform one or more actions.

9. The computer program product of claim 8, wherein the one or more actions comprises automatically routing incoming functionality packets, wherein the functionality packets are associated with at least one operation of the entity, wherein each of the functionality packets comprises one or more assignments.

10. The computer program product of claim 8, wherein the one or more actions comprise:

identifying at least one other user that is capable of completing one or more assignments in at least one functionality packet allocated to the at least one user; and rerouting the at least one functionality packet to the at least one other user.

11. The computer program product of claim 8, wherein the one or more actions comprise:

automatically generating one or more notifications associated with the real-time anomaly; and transmitting the one or more notifications to at least one other user, wherein the at least one other user is associated with the at least one user.

12. The computer program product of claim 8, wherein processing the activity data, the operation data, and the failure data comprises:

identifying one or more failures based on the failure data;

correlating the one or more failures with the activity data to determine one or more patterns associated with the one or more users, wherein at least a part of the one or more users are associated with the one or more failures; and determining threshold limits associated with the one or more users based on the one or more patterns and the operation data, wherein the threshold limits and the one or more patterns in combination forms the computed data.

13. A computer implemented method for routing functionality packets based on monitoring real-time indicators, wherein the method comprises:

collecting activity data from one or more monitoring devices over a period of time, wherein the activity data is associated with one or more users comprising at least one user;

collecting failure data associated with one or more operations of an entity;

extracting operation data associated with the one or more operations of the entity;

processing the activity data, the operation data, and the failure data to generate computed data;

continuously gathering real-time input data from the one or more monitoring devices, wherein the real-time input data is associated with the at least one user;

aggregating and processing the real-time input data and the computed data, wherein processing comprises comparing the real-time input data and the computed data; and in response to aggregating and processing the real-time input data and the computed data, dynamically identifying a real-time anomaly associated with the at least one user.

14. The computer implemented method of claim 13, wherein the method further comprises:

in response to dynamically identifying the real-time anomaly, automatically perform one or more actions.

15. The computer implemented method of claim 14, wherein the one or more actions comprises automatically routing incoming functionality packets, wherein the functionality packets are associated with at least one operation of the entity, wherein each of the functionality packets comprises one or more assignments.

16. The computer implemented method of claim 14, wherein the one or more actions comprise:

identifying at least one other user that is capable of completing one or more assignments in at least one functionality packet allocated to the at least one user; and rerouting the at least one functionality packet to the at least one other user.

17. The computer implemented method of claim 14, wherein the one or more actions comprise:

automatically generating one or more notifications associated with the at least one real-time anomaly; and transmitting the one or more notifications to at least one other user, wherein the at least one other user is associated with the at least one user.

18. The computer implemented method of claim 13, wherein processing the activity data, the operation data, and the failure data comprises:

identifying one or more failures based on the failure data;

correlating the one or more failures with the activity data to determine one or more patterns associated with the one or more users, wherein at least a part of the one or more users are associated with the one or more failures; and determining threshold limits associated with the one or more users based on the one or more patterns and the operation data, wherein the threshold limits and the one or more patterns in combination forms the computed data.

* * * * *